United States Patent
Spampinato et al.

(10) Patent No.: US 9,100,573 B2
(45) Date of Patent: Aug. 4, 2015

(54) LOW-COST ROTO-TRANSLATIONAL VIDEO STABILIZATION

(71) Applicant: STMicroelectronics S.r.l., Agrate Brianza (IT)

(72) Inventors: Giuseppe Spampinato, Catania (IT); Arcangelo Ranieri Bruna, Giardini Naxos (IT); Giovanni Puglisi, S. Venerina (IT); Sebastiano Battiato, Aci Catena (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/841,583

(22) Filed: Mar. 15, 2013

(65) Prior Publication Data

US 2013/0286241 A1  Oct. 31, 2013

(30) Foreign Application Priority Data

Apr. 17, 2012  (IT) ................ VI2012A0087

(51) Int. Cl.
| | |
|---|---|
| H04N 5/228 | (2006.01) |
| G06K 9/40 | (2006.01) |
| H04N 5/232 | (2006.01) |
| H04N 5/14 | (2006.01) |

(52) U.S. Cl.
CPC ....... *H04N 5/23248* (2013.01); *H04N 5/23254* (2013.01); *H04N 5/144* (2013.01); *H04N 5/23267* (2013.01)

(58) Field of Classification Search
USPC ...................................... 348/222.1; 382/360
See application file for complete search history.

(56) References Cited

U.S. PATENT DOCUMENTS

| | | | |
|---|---|---|---|
| 5,742,710 | A | 4/1998 | Hsu et al. |
| 7,831,088 | B2 | 11/2010 | Frakes et al. |
| 2002/0163968 | A1 | 11/2002 | Moschetti |
| 2004/0258155 | A1 | 12/2004 | Lainema et al. |
| 2007/0076982 | A1 | 4/2007 | Petrescu |
| 2007/0140591 | A1 | 6/2007 | Kurata |
| 2008/0063069 | A1 | 3/2008 | Sekiguchi et al. |

(Continued)

FOREIGN PATENT DOCUMENTS

| | | |
|---|---|---|
| EP | 0613020 | 8/1994 |
| EP | 2058760 | 5/2009 |

(Continued)

OTHER PUBLICATIONS

Search Report for Italian Application Serial No. VI20120087, Ministero dello Sviluppo Economico, Munich, Jan. 8, 2013, pp. 2.

(Continued)

*Primary Examiner* — Roberto Velez
*Assistant Examiner* — Stephen Coleman
(74) *Attorney, Agent, or Firm* — Seed IP Law Group PLLC

(57) ABSTRACT

A method and system for filtering an image frame of a video sequence from spurious motion, comprising the steps of dividing the image frame and a preceding image frame of the video sequence into blocks of pixels; determining motion vectors for the blocks of the image frame; determining inter-frame transformation parameters for the image frame based on the determined motion vectors; and generating a filtered image frame based on the determined inter-frame transformation parameters; wherein the image frame is dived into overlapping blocks.

35 Claims, 11 Drawing Sheets

(56) References Cited

U.S. PATENT DOCUMENTS

| | | |
|---|---|---|
| 2008/0175439 A1 | 7/2008 | Kurata |
| 2008/0187048 A1* | 8/2008 | Baik et al. ............... 375/240.16 |
| 2009/0123082 A1 | 5/2009 | Atanssov et al. |
| 2010/0124379 A1 | 5/2010 | Bruna et al. |
| 2010/0124381 A1 | 5/2010 | Bossen |
| 2010/0166300 A1 | 7/2010 | Spampinato et al. |
| 2011/0211083 A1 | 9/2011 | Petrides |

FOREIGN PATENT DOCUMENTS

| | | |
|---|---|---|
| EP | 2204982 | 7/2010 |
| JP | 10-13718 A | 1/1998 |

OTHER PUBLICATIONS

Hirohisa Jozawa, Hiroshi Watanabe, and Sharad Singhal, "Interframe Video Coding Using Overlapped Motion Compensation and Perfect Reconstruction Filter Banks", Proceedings of the International Conference on Acoustics, Speech and Signal Processing (Icassp), New York, IEEE, US, vol. 4, Mar. 23, 1992, pp. 649-652, XP010059043.

A. Engelsberg, G. Schmidt, "A comparative review of digital image stabilizing algorithms for mobile video communications", IEEE Transactions on Consumer Electronics, vol. 45, No. 3, Aug. 1999; pp. 591-597.

J.K. Paik, Y.C. Park, D.W. Kim, "An adaptive motion decision system for digital image stabilizer based on edge pattern matching", IEEE ICCE Consumer Electronics, IEEE Journals & Magazines, vol. 38, Issue 3, Jun. 1992; pp. 607-616.

M. Kim, E. Kim, D. Shim, S. Jang, G. Kim, and W. Kim, "An Efficient Global Motion Characterization Method for Image Processing Applications," IEEE Transactions on Consumer Electronics, vol. 43, Issue 4, Nov. 1997, pp. 1010-1018.

Y. Koo and W. Kim, "An Image Resolution Enhancing Technique Using Adaptive Sub-Pixel Interpolation for Digital Still Camera System", IEEE Transactions on Consumer Electronics, vol. 45, No. 1., Feb. 2005, pp. 118-123.

S. Auberger and C. Miro, Digital Video Stabilization Architecture for Low Cost Devices, Proceedings of the 4th International Symposium on Image and Signal Processing and Analysis, IEEE Conference Publications, 2005, pp. 474-479.

F. Vella, A. Castorina, M. Mancuso, and G. Messina, Digital Image Stabilization by Adaptive Block Motion Vectors Filtering, IEEE Transactions on Consumer Electronics, IEEE Journals & Magazines, vol. 48, Issue 3, Aug. 2002, pp. 796-801.

Battiato et al., "A Robust Block-Based Image/Video Registration Approach for Mobile Imaging Devices," IEEE Transactions on Multimedia 12(7):622-635, Nov. 2010.

Battiato et al., "A Robust Video Stabilization System by Adaptive Motion Vectors Filtering," IEEE International Conference on Multimedia and Expo, Hannover, Jun. 23-Jun. 26, 2008, pp. 373-376.

Bosco et al., "Digital Video Stabilization through Curve Warping Techniques," IEEE Transactions on Consumer Electronics 54(2):220-224, May 2008.

Bruna et al., "Digital Video Stabilisation in modern and next generation imaging systems," Proceedings of NEM Summit 2008, Saint-Malo, France, retrieved from: http://iplab.dmi.unict.it/download/Elenco%20Pubblicazioni%20%28PDF%29/International%20Conferences/DIS_NEM08.pdf, 4 pages.

Chang et al., "Digital Image Translational and Rotational Motion Stabilization Using Optical Flow Technique," IEEE Transactions on Consumer Electronics 48(1): 108-115, Feb. 2002.

Cho et al., "Affine Motion Based CMOS Distortion Analysis and CMOS Digital Image Stabilization," IEEE Transactions on Consumer Electronics 53(3):833-841, Aug. 2007.

Haupt et al., Practical Genetic Algorithms $2^{nd}$ ed., excerpts "Introduction to Optimization," and "The Binary Genetic Algorithm," John Wiley & Sons, 2004, 30 pages.

Kim et al., "Interlaced-to-progressive conversion using adaptive projection-based global and representative local motion estimation," Journal of Electronic Imaging 17(2):023008, Apr.-Jun. 2008, 14 pages.

Niskanen et al., "Video Stabilization Performance Assessment," IEEE International Conferences on Multimedia and Expo, Toronto, Ont, Jul. 9-12, 2006, pp. 405-408.

Paik et al., "An Edge Detection Approach to Digital Image Stabilization Based on Tri-State Adaptive Linear Neurons," IEEE Transactions on Consumer Electronics 37(3):521-530, Aug. 1991.

Park et al., "An Adaptive Motion Decision System for Digital Image Stabilizer Based on Edge Pattern Matching," IEEE International Conference on Consumer Electronics, Digest of Technical Papers, Rosemont, IL, Jun. 2-4, 1992, pp. 318-319.

Soldatov et al., "Low Complexity Global Motion Estimation from Block Motion Vectors," retrieved from: http://graphicon.ru/oldgr/en/publications/text/ks_sccg06.pdf on Nov. 15, 2008, 7 pages.

Tico et al., "Method of Motion Estimation for Image Stabilization," IEEE International Conference on Acoustics, Speech and Signal Processing, 2006, vol. 2, Toulouse, May 14-19, 2006, 4 pages.

Yang et al., "Online Video Stabilization Based on Particle Filters," IEEE International Conference on Image Processing, Atlanta, GA, Oct. 8-11, 2006, pp. 1545-1548.

Yasunobu et al., "Automatic Train Operation System by Predictive Fuzzy Control," in Industrial Applications of Fuzzy Control, M. Sugeno (ed.), Elsevier Science Publishers B.V., North Holland, 1985, 22 pages.

* cited by examiner

| Sequence type | Sequence dimensions | Searching window | Block dimensions | Blocks number |
|---|---|---|---|---|
| <QVGA | <320X240 | 16X16 | 64x64 | <= 15 |
| QVGA | 320X240 | 16X16 | 64x64 | 5x3=15 |
| >QVGA <VGA | >320X240 <640X480 | 32x32 | 96x96 | >= 15 <= 30 |
| VGA | 640X480 | 32x32 | 96x96 | 6x5=30 |
| >VGA <SVGA | >640X480 <800X600 | 40x40 | 112x112 | >=30 <= 35 |
| SVGA | 800X600 | 40x40 | 112x112 | 7x5= 35 |
| >SVGA <HDTV | >800X600 <1280X720 | 64x64 | 160x160 | >=32 <= 35 |
| HDTV | 1280X720 | 64x64 | 160x160 | 8x4= 32 |

| Sequence type | Sequence dimensions | Searching window | Block dimensions | Overlap | Blocks number |
|---|---|---|---|---|---|
| <QVGA | <320X240 | 16X16 | 64x64 | <=16x16 | depending on overlap |
| QVGA | 320X240 | 16X16 | 64x64 | 16x16 | 17x12=204 |
| >QVGA <VGA | >320X240 <640X480 | 32x32 | 96x96 | >= 16x16 <= 32x32 | >= 204 |
| VGA | 640X480 | 32x32 | 96x96 | 32x32 | 17x12=204 |
| >VGA <SVGA | >640X480 <800X600 | 40x40 | 112x112 | >=32x32 <= 40x40 | >=204 |
| SVGA | 800X600 | 40x40 | 112x112 | 40x40 | 18x13=234 |
| >SVGA <HDTV | >800X600 <1280X720 | 64x64 | 160x160 | >=40x40 <= 48x48 | >=234 |
| HDTV | 1280X720 | 64x64 | 160x160 | 48x48 | 23x12=276 |

LOW-COST ROTO-TRANSLATIONAL VIDEO STABILIZATION

PRIORITY CLAIM

The instant application claims priority to Italian Patent Application No. VI2012A000087, filed Apr. 17, 2012, which application is incorporated herein by reference in its entirety.

BACKGROUND

Digital video capturing means are well-known in the consumer mass market and available for relatively low prices. However, amateur videos often suffer from misalignments of consecutive frames caused by hand-shaking (trembling). Thus, a variety of stabilization techniques based on motion estimation is known in the art (see, for example, A. Engelsberg, G. Schmidt, "A comparative review of digital image stabilizing algorithms for mobile video communications", IEEE Transactions on Consumer Electronics, Vol. 45, No. 3, August 1999; J. K. Paik, Y. C. Park, D. W. Kim, "An adaptive motion decision system for digital image stabilizer based on edge pattern matching", IEEE ICCE Consumer Electronics, Digest of Technical Papers, June1992 which are incorporated herein by reference).

In particular, motion estimation based on horizontal and vertical characteristic curves has been implemented (see, for example, M. Kim, E. Kim, D. Shim, S. Jang, G. Kim, and W. Kim, "An Efficient Global Motion Characterization Method for Image Processing Applications," IEEE Trans. On Consumer Electronics, pages 1010-1018, November 1997; Y. Koo and W. Kim, "An Image Resolution Enhancing Technique Using Adaptive Sub-Pixel Interpolation For Digital Still Camera System", IEEE Transactions On Consumer Electronics, Vol. 45, No. 1., February 2005 which are incorporated herein by reference). However, these kinds of stabilization methods are not sufficiently reliable in the cases of illumination changes, motion blur, new details entering into the scene or moving objects in the scene. These problems have partially been addressed in US 2010/124379 A1 and EP 2 204 982 A1 (which are incorporated herein by reference) wherein an algorithm was provided that particularly allows for the reduction of motion blur and distraction by moving objects. However, the proposed algorithm may be improved with respect to the overall stabilization preciseness and handling of regular patterns. Therefore, despite the recent technology advancements there is still a need for an improved video stabilization method taking into account the restricted computational resources available in video capturing mass products.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
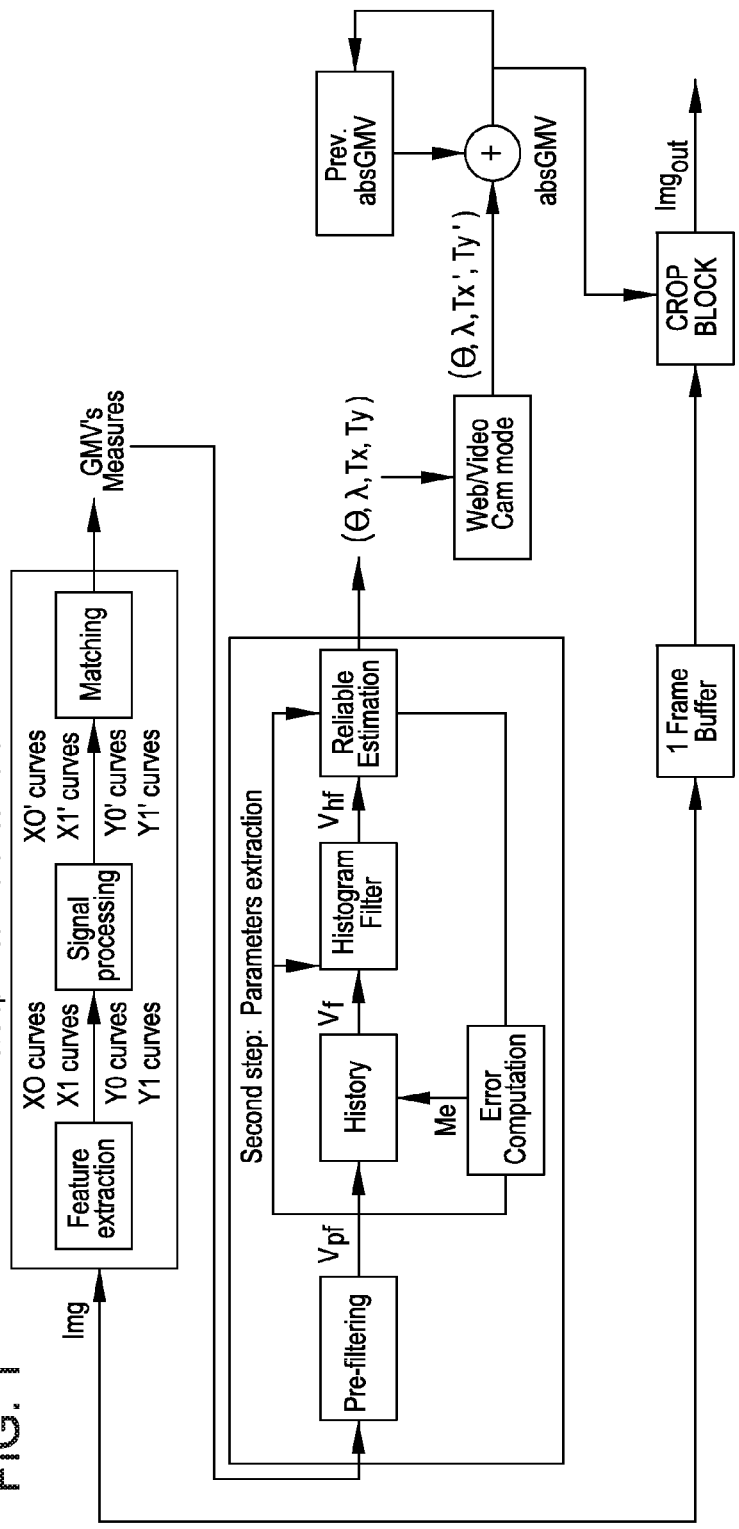
FIG. 1 illustrates basis steps of an example of the herein disclosed method for digital video stabilization according to an embodiment.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method that addresses the above-mentioned need and, accordingly, relates to a method for compensating for unintentional motion in a video sequence caused by hand-shaking. It is provided, a method for filtering an image of a video sequence of images from spurious motion caused by hand-shaking (trembling). The method for filtering an image frame of a video sequence from spurious motion, comprises the steps of dividing the (current) image frame and a preceding image frame of the video sequence into blocks of pixels; determining motion vectors for the blocks of the (current) image frame; determining inter-frame transformation parameters for the (current) image frame based on the determined motion vectors; and generating a filtered image frame (from the current image frame)

based on the determined inter-frame transformation parameters; wherein the image frame is dived into overlapping blocks.

In principle, motion vectors can be determined by any method known in the art, for example, block matching algorithms as disclosed by S. Auberger and C. Miro, Digital Video Stabilization Architecture For Low Cost Devices, Proceedings of the 4th International Symposium on Image and Signal Processing and Analysis, page 474, 2005, or F. Vella, A. Castorina, M. Mancuso, and G. Messina, Digital Image Stabilization By Adaptive Block Motion Vectors Filtering, IEEE Trans. on Consumer Electronics, 48(3):796-801, August 2002 or in EP 2 204 982 A1 (which is incorporated herein by reference).

In the overall filtering procedure, the step of dividing a current frame into blocks of pixels is crucial for the resulting filtered image. The number of blocks obtained is important because each block should be big enough to allow for a good estimation of the respective motion vector and small enough to have a considerable number of motion vectors in order to facilitate extraction of the inter-frame transformation parameters.

According to an embodiment, overlapping blocks are obtained for an image frame under consideration. Each of the overlapping blocks may have the same number of pixels X. Then, both in the vertical direction and the horizontal direction neighboring blocks share some predetermined number of pixels X/Y where Y determines the number of pixels shared. Consider, for example, an area of the image frame of 128×128 pixels. This area might be divided into five blocks: A first block B0=(0 . . . 63, 0 . . . 63), i.e., comprising the first 64 pixels in each direction, a second block B1=(16 . . . 79, 16 . . . 79), a third block B2=(32 . . . 95, 32 . . . 95), a fourth block B3=(48 . . . 111, 48 . . . 111), and a fifth block B4=(64 . . . 127, 64 . . . 127). Thus, instead of two non-overlapping blocks (for pixels (0 . . . 63, 0 . . . 63) and (64 . . . 127, 64 . . . 127)), a number of overlapping blocks (in this example, five overlapping) are employed. By dividing the image frame into overlapping blocks, the number of motion vectors and blocks to be used for the determination of the inter-frame transformation parameters can be increased without making the sizes of the blocks too small for a reliable determination of the motion vectors.

The motion vectors can be determined by block matching and each of the blocks may comprise a sub-set of pixels that are used for the determination of the motion vectors. For example, each block comprises a searching window at each margin (left, right, top, bottom) wherein the searching windows comprise a predetermined number of (marginal) pixels that are not used for determining the motion vectors (block matching) thereby defining some maximum allowed movement of the blocks from one frame to another in the vertical and horizontal directions.

Experiments have shown that using at least 32 pixels used for the block matching and/or sizes of the searching windows in each direction of more than 5% of the dimension (number of pixels) of the image frame in that direction and/or at least 200 blocks into which the image frame is divided provides satisfying results for both the determination of the motion vectors and the determination of the inter-frame transformation parameters. It should be noted that, in principle, the embodiments described herein may comprise either dividing frames into overlapping blocks or using blocks with searching windows that are not used for block matching, i.e., providing overlapping blocks and searching windows that are not necessarily combined. Thus, it is provided a method for filtering an image frame of a video sequence from spurious motion, comprising the steps of dividing the image frame and a preceding image frame of the video sequence into blocks of pixels; determining motion vectors for the blocks of the image frame by block matching; determining inter-frame transformation parameters for the image frame based on the determined motion vectors; and generating a filtered image frame based on the determined inter-frame transformation parameters; wherein each block comprises a searching window at each margin (left, right, top, bottom) wherein the searching windows comprise a predetermined number of (marginal) pixels that are not used for determining the motion vectors (block matching). Each of the searching windows may comprise 16×16, or 32×32, or 40×40 or 64×64 pixels and/or each of the blocks may comprise 64×64, 96×96, or 112×112 or 160×160 pixels and/or overlapping regions of the blocks may comprise 16×16, or 32×32, or 40×40 or 48×48 pixels.

As it discussed in EP 2 204 982 A1, integral projections techniques of the art suffer from problems arising when new different details or regular patterns come into the imaged scene. In fact, a new matching formula was introduced in EP 2 204 982 A1 (see equations 5 and 6 or 9 and 10 of that document). In particular, in the presence of a regular pattern a matching curve representing the pattern may comprise a plurality of minima of similar values. In such a case, two successive minima and a maximum located between these minima can be considered and wrong local minima selection can be avoided according to the teaching of EP 2 204 982 A1. For this, a percentage P is defined:

$$P=(|min1-min2|))/(max1-min(min1, min2)$$

and if the percentage P is less than some predetermined threshold T the selected new minimum will be the one with the lower position (smaller absolute value on the abscissa) of min1 and min2, otherwise, the selected new minimum will be the minimum of min1 and min2).

However, the precision of the matching taught in EP 2 204 982 A1 can even be improved as follows (see also description of FIGS. 13 and 14 below). Say, a (global) minimum is determined for a pixel $B(x_2, y_2)$. Then, the previous integer value, $A(x_2, y_2)$, (pixel value of the previous pixel) and the following integer value, $C(x_2, y_2)$, (pixel value of the previous pixel) are considered also. Now, it is the task to determine the coefficients a, b, and c of the equation of the parabola $y=ax^2+bx+c$ connecting A, B, and C. The vertex of the parabola is determined and this is taken as the new minimum. Thus, the minimum is determined on a sub-pixel (non-integer) scale thereby improving the accuracy of the matching process.

Starting from the determined motion vectors, for example, obtained based on some block matching algorithm known in the art, inter-frame parameters are extracted employing rejection rules (see detailed description below). In particular, an embodiment provides a new application of a histogram filter during the process of inter-frame parameter estimation (see also FIG. 15 and description thereof below).

Figure 8:
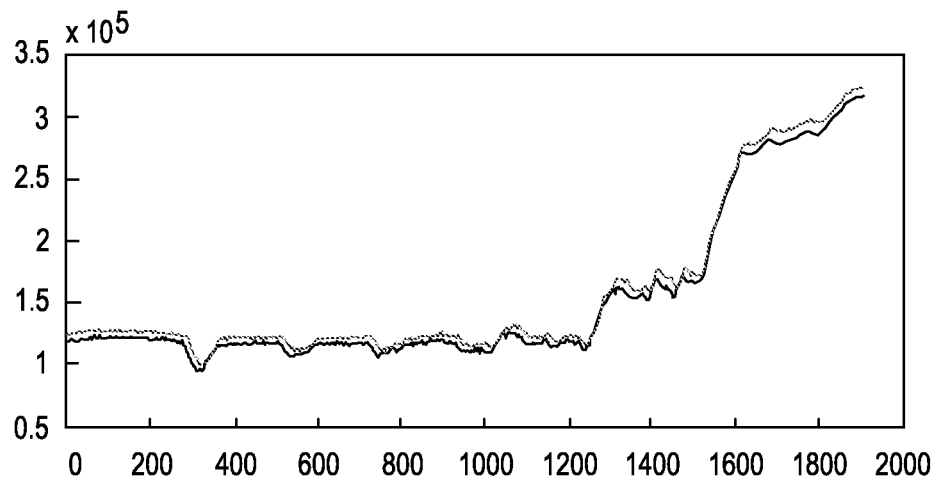

As already described in US 2010/124379 A1 due to moving objects in the imaged scene there are motion vectors that are correctly calculated by block matching that are to be deleted for determining inter-frame parameters. In particular, big moving objects (for example, with sized of 50% of the image frame or more) can be dealt with a history filter (see FIG. 8 of US 2010/124379 A1). Application of the history filter described in US 2010/124379 A1 is also foreseen according to an exemplary embodiment of the herein disclosed method. Robustness of the inter-frame parameter can be further improved as follows. In presence of big moving objects (at least 50% of the entire frame in size) a histogram of motion vectors exhibits multiple peaks. One of the peaks is caused by camera motion whereas the other ones are caused by the moving object. According to an embodiment a histogram filter is used that finds the highest peak in the histogram of motion vectors and filters out all (components of) motion vectors that are too far away from the found highest peak. Decision about "too far away" is made by a threshold for the distance that is determined based on the maximum allowed rotation and scale. Histograms are related to Motion Vectors, found block by block. On the axes are shown the number of Motion Vectors which have the same value. Allowed rotation/scale is the range of values in which they are assumed to vary. These values can be experimentally obtained on a set of testing sequences. Examples are $-5°<=$rotation $<=5°$ and $0.9<=$scale $<=1.1$.

An embodiment making use of the histogram filter, may further comprise applying a history filter to motion vectors determined for a current image frame comprising determining a first set of motion vectors that are the same as motion vectors determined for a previous image frame and a second set of motion vectors that are not the same as motion vectors determined for the previous image frame, deleting some motion vectors of the first and second sets of motion vectors and combining the thus reduced sets of motion vectors to obtain a combined set of motion vectors and wherein the histogram filter is applied to the combined set of motion vectors. The second set of motion vectors may be reduced based on an error matrix determined for the previous image frame as described below.

It should be noted that the application of the histogram filter can be combined with the employment of overlapping blocks and blocks comprising searching windows as described above. In principle, the histogram filter can be used in a method for filtering an image frame based on non-overlapping blocks without searching windows. Thus, it is provided a method for filtering an image frame of a video sequence from spurious motion, comprising the steps of dividing the (current) image frame and a preceding image frame of the video sequence into blocks of pixels; determining motion vectors for the blocks of the (current) image frame; determining inter-frame transformation parameters for the (current) image frame based on the determined motion vectors; and generating a filtered image frame (from the current image frame) based on the determined inter-frame transformation parameters; and further comprising applying a histogram filter to determined motion vectors to filter out motion vectors that are too far away (beyond a predetermined threshold) from a highest peak found in a generated histogram of the motion vectors.

It is also provided herein a mobile video capturing device (for example, a digital video camera, a mobile phone or a digital camera), comprising a processor configured to perform the steps of the methods according to one of the above-described examples.

Figure 2:
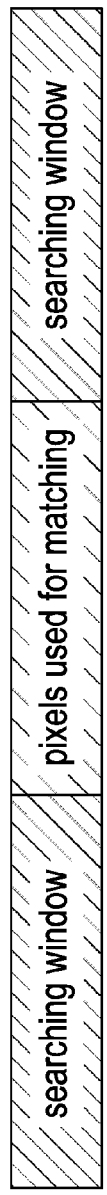
FIG. 2 illustrates a block comprising searching windows at the margin and pixels used for matching according to an embodiment.
Figures 3, 4:
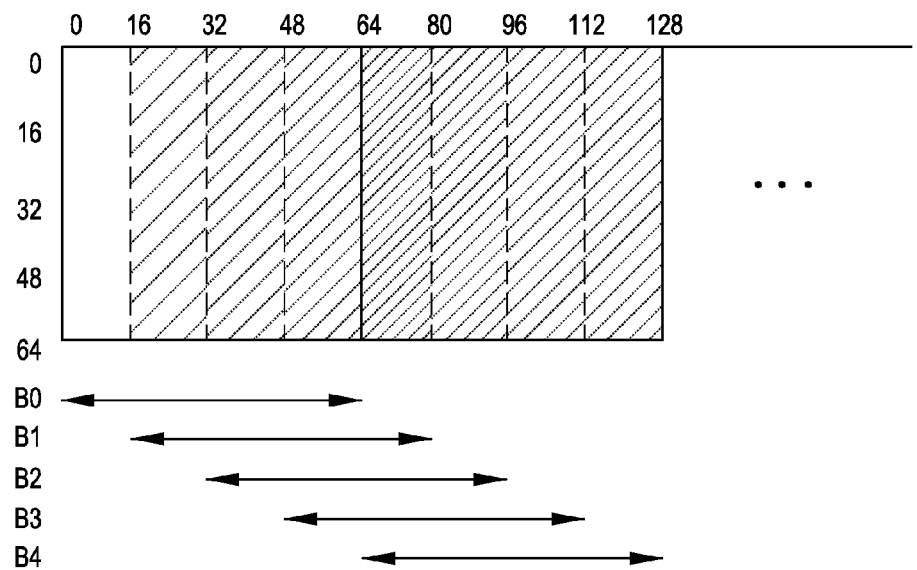
FIG. 3 shows a table with typical figures for sizes of searching windows and blocks as well as block numbers according to an embodiment.
FIG. 4 illustrates overlapping blocks according to an embodiment.

In the following, an example of the disclosed method for digital video stabilization is described with reference to FIG. 1. In a first step block motion estimation is performed. In this step, motion vectors are estimated for the incoming video frames that are divided into blocks. Moreover, particular parameters are calculated that are used in the subsequent second step of parameter extraction. When dividing frames into blocks some compromise between blocks big enough to allow for a reliable motion estimation and small enough to facilitate a good parameter extraction has to be found, in principle. According to this example, not all pixels of a block are used for motion estimation. Rather, one defines searching windows, i.e., the maximum allowed movements in the horizontal and vertical directions (see FIG. 2). A typical number of pixels allowing for reliable motion estimation is 32 or more. Typical figures of the block division that have proven to allow for reliable motion estimation are shown in FIG. 3. However, for a good parameter extraction more blocks are necessary than shown in FIG. 3. More blocks allow for the estimation of more motion vectors.

According to an example one may use overlapped blocks with two parameters: OverlapX and OverlapY, which represent the number of pixel to shift starting from the origin of the frame to obtain the new block, respectively in horizontal and vertical directions. An example is shown in FIG. 4. In this case, the horizontal dimension of the blocks is BlockSizeX=64 and the horizontal overlap OverlapX=16, so the first block (not overlapped (normal)) is given by B0=(0 . . . 63, 0 . . . 63), while the second block is given by B1=(16 . . . 79, 16 . . . 79) and so on up to the block B4=(64 . . . 127, 64 . . . 127). So instead of two blocks in the area of the frame of 128×64 pixels, we obtain five blocks. In general, to know the total number of blocks BlockNumber, the following formula is applied:

BlockNumber$X$=((Width−BlockSize$X$)/Overlap$X$)+1

BlockNumber$Y$=((Height−BlockSize$Y$)/Overlap$Y$)+1

BlockNumber=BlockNumber$X$·BlockNumber$Y$ where Width and Height are the horizontal and vertical dimensions of the frame, while BlockSizeX and BlockSizeY are the horizontal and vertical dimensions of the block. A suitable number of blocks, for example, is 200 or more.

Next, feature extraction based on horizontal and vertical characteristics curve is to be performed. The row/column features (RCF) along the horizontal (m) and vertical (n) dimensions can be calculated from:

$$RCF_k^x(j) = \sum_{i=1}^{m} p_{ij}$$

$$RCF_k^y(i) = \sum_{j=1}^{n} p_{ij}$$

as it is described in EP 2 204 982 A1 ($p_{ij}$ is the pixel value in position (i,j)).

Figures 5, 6:
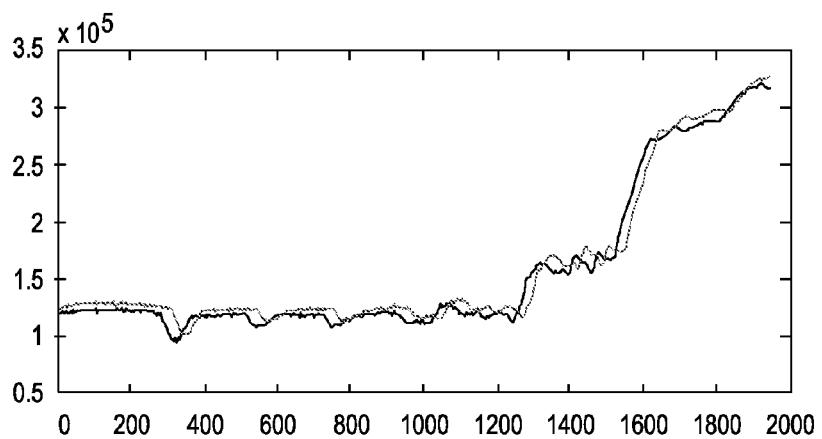
FIG. 5 shows a table with typical figures for sizes of searching windows and blocks and overlapping regions as well as block numbers according to an embodiment.
FIG. 6 shows two successive curves differing from each other due to change in illumination according to an embodiment.
Figure 7:
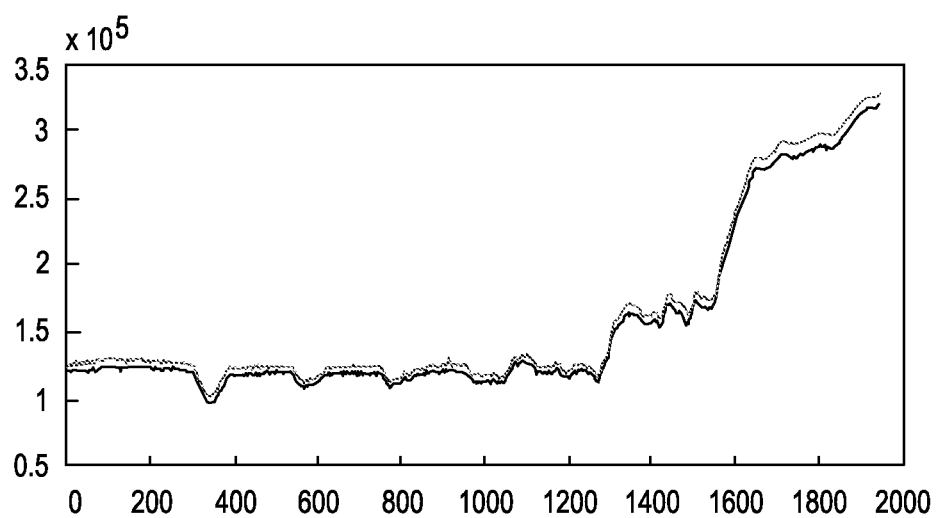
FIGS. 7 and 8 show ideal matching and incorrect matching according to the integral projection method, respectively, for illumination change according to an embodiment.

The signal processing block of the first step illustrated in FIG. 1 deals with the problems to reduce the scene change illumination and motion blur effects, while original integral projection techniques (M. Kim, E. Kim, D. Shim, S. Jang, G. Kim, and W. Kim, "An Efficient Global Motion Characterization Method for Image Processing Applications," IEEE Trans. On Consumer Electronics, pages 1010-1018, November 1997; Y. Koo and W. Kim, "An Image Resolution Enhancing Technique Using Adaptive Sub-Pixel Interpolation For Digital Still Camera System", IEEE Transactions On Consumer Electronics, Vol. 45, No. 1., February 2005) suffer from this kind of problems. In order to illustrate the effect of illumination changes in the calculated row/column features the following example is provided. Two successive curves are displayed in FIG. 6. It is to note that the shape of the curves is really similar, but the values are slightly different for the scene illumination changes. The results of the ideal matching (−29) is shown in FIG. 7. With the classic integral projection method, the matching is not correct, like indicated in FIG. 8. Mainly the high dynamic changes occurring around the point

1600 cause method failure. The integral projection method, particularly, suffers from the strong edge around the point 1600.

It has been observed that better stabilization results can be obtained by pre-filtering the row/column features with a High Pass Filter (HPF), thus enhancing curve peaks, obtained in the following way:

$$C_x^{fil} = C_x - (C_x \otimes LPF)$$

$$C_y^{fil} = C_y - (C_y \otimes LPF)$$

Figure 9:
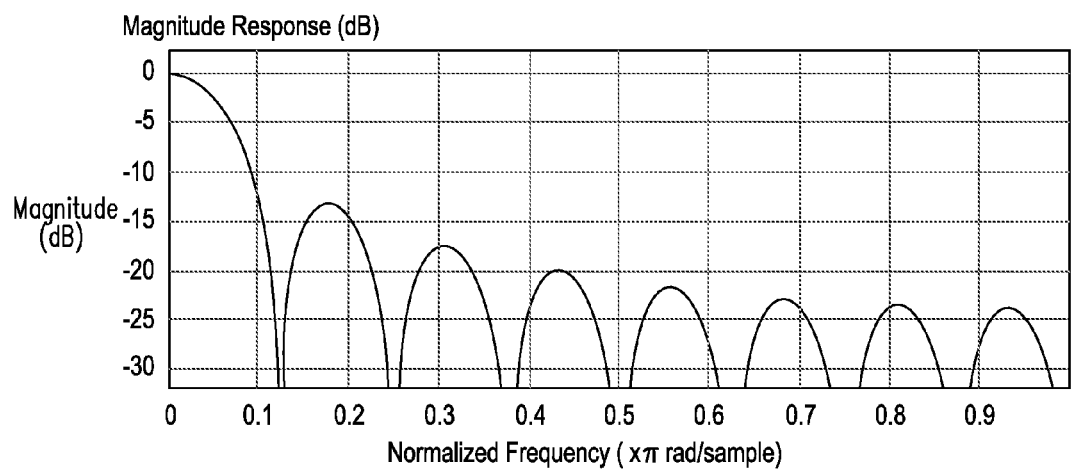
FIG. 9 shows a response of a high pass filter used for pre-filtering row/column features according to an embodiment.
Figure 10:
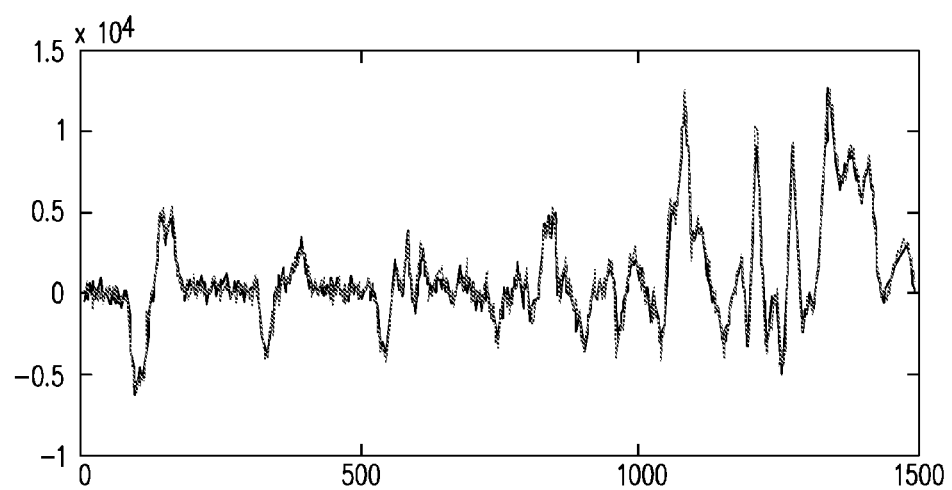
FIG. 10 shows a matching result obtained by the filter illustrated in FIG. 9 according to an embodiment.
Figure 11:
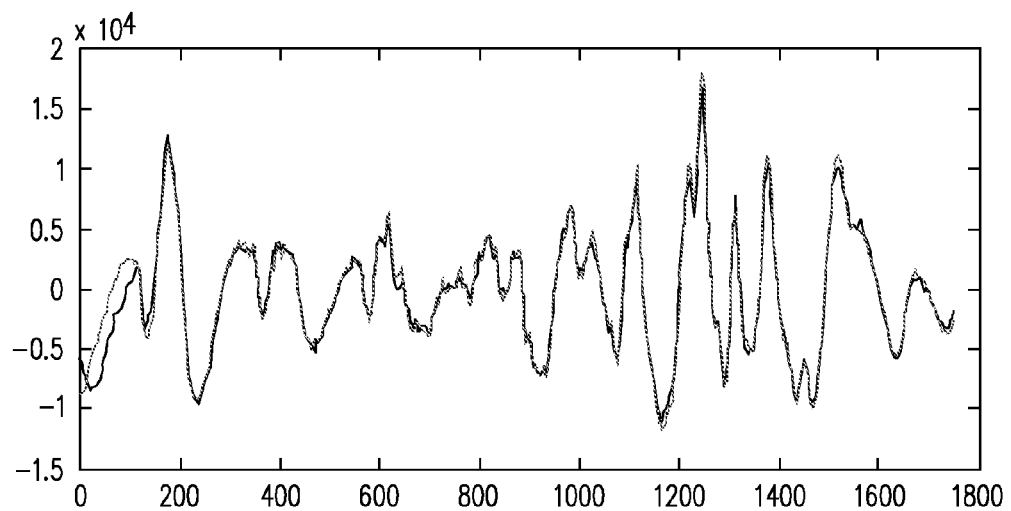
FIG. 11 shows a matching result obtained by means of a Butterworth IIR band pass filter according to an embodiment.
Figure 12:
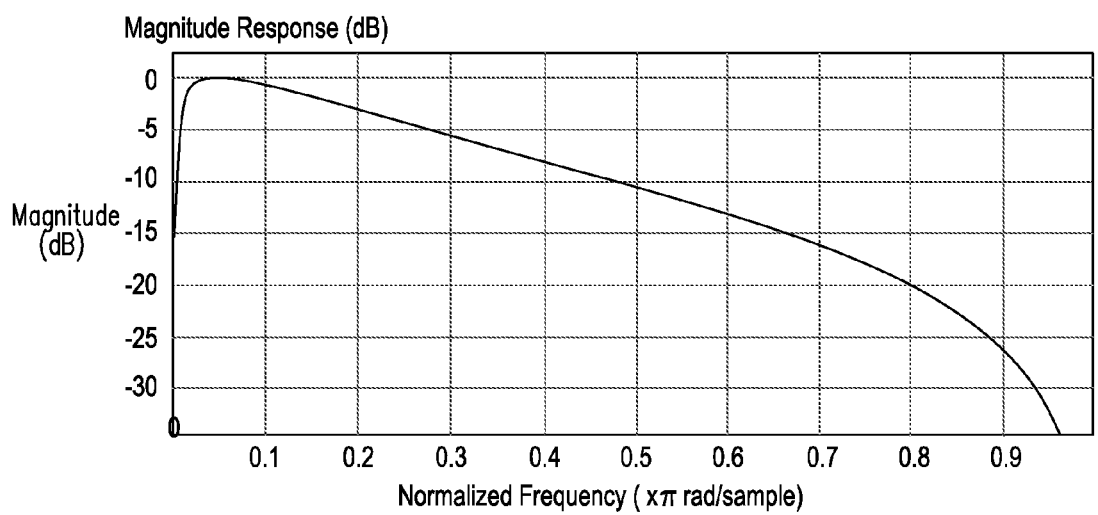
FIG. 12 illustrates a response of the filter used to obtain the result shown in FIG. 11.

A Low Pass Filter (LPF) with 16 ones (i.e., [1111111111111111]/16) allows obtaining a simple HPF, with good results and low extra cost, by subtracting the filtered data from the original one. The filter response is shown in FIG. 9. In the example proposed, with this simple filter, we obtain a good matching (−29), as shown in FIG. 10. This solution provides good results and it is simple to implement (just 15 sums and 1 shift operations per sample). It is noted that, alternatively, a Butterworth IIR Band Pass Filter (BPF) might be used. Experiments have shown that a $2^{nd}$ order, Direct form II, with cutoff frequencies w1=0.01 Hz and w2=0.20 Hz filter is suitable, for example. Matching results and the magnitude response obtained by such a filter are shown in FIGS. 11 and 12.

Another problem to deal with is motion blur. The mentioned Butterworth IIR Band Pass Filter (BPF) is particularly suitable to deal with this problem. Alternatively, a Butterworth FIR HPF can be used (see detailed description in EP 2 204 982 A1).

The matching block of Step 1 of FIG. 1 deals with problems arising from new details coming into the scene captured by an image capturing means and taking into account regular pattern features as also described in EP 2 204 982 A1.

According to an embodiment, sub-pixel estimation is performed in order to increase precision of the matching. We consider three points in the matching: the chosen minimum (B) and the previous (A) and following (C) integer value. With these three points we tend to determine the parabola passing for these three points and the new minimum chosen will be the minimum of the obtained parabola.

Considering, for example, the three points $A=(x_1,y_1)$, $B=(x_2,y_2)$ and $C=(x_3,y_3)$. The problem is to determine the coefficients a, b, c of the equation of the parabola $y=ax^2+bx+c$ passing for the points A, B, C. The solution is the following:

$$a=(x_1 \cdot (y_3-y_2)-x_2 \cdot y_3+x_3 \cdot y_2+(x_2-x_3) \cdot y_1)/den;$$

$$b=-(x_1^2 \cdot (y_3-y_2)-x_2^2 \cdot y_3+x_3^2 \cdot y_2+(x_2^2-x_3^2) \cdot y_1)/den;$$

$$c=(x_1 \cdot (x_3^2 \cdot y_2-x_2^2 \cdot y_3)+x_1^2 \cdot (x_2 \cdot y_3-x_3 \cdot y_2)+(x_2^2 \cdot x_3 - x_2 \cdot x_3^2) \cdot y_1)/den;$$

$$den=(x_1 \cdot (x_3^2-x_2^2)-x_2 \cdot x_3^2+x_2^2 \cdot x_3+x_1^2 \cdot (x_2-x_3));$$

To optimize the number of the operations needed, we can simplify as follows:

$$a=(t_1-t_2+t_3+t_4)/den;$$

$$b=-(x_1 \cdot t_1-x_2 \cdot t_2+x_3 \cdot t_3+x_2 \cdot t_{4a}-x_3 \cdot t_{4b})/den;$$

$$c=(-x_{22} \cdot t_{1a}+x_{32} \cdot t_{1b}+x_{12} \cdot t_2-x_{12} \cdot t_3-x_{32} \cdot t_{4a}+x_{22} \cdot t_{4b})/den;$$

$$den=(x_{12} \cdot (x_2-x_3)+x_{22} \cdot (x_3-x_1)+x_{32} \cdot (x_1-x_2));$$

where:

$$t_{1a}=x_1 \cdot y_3;\ t_{1b}=x_1 \cdot y_2;\ t_1=t_{1a}-t_{1b};$$

$$t_2=x_2 \cdot y_3;\ t_3=x_3 \cdot y_2;$$

$$t_{4a}=x_2 \cdot y_1;\ t_{4b}=x_3 \cdot y_1;\ t_4=t_{4a}-t_{4b};$$

$$x_{12}=x_1^2;\ x_{22}=x_2^2;\ x_{32}=x_3^2;$$

Since the vertex of the parabola (that is the minimum we are looking for) is at the location $V=(V_x,V_y)=(-b/(2 \cdot a), (4 \cdot a \cdot c-b2)/(4 \cdot a))$, the total number of operations to calculate it are: 22 sums, 2 shifts, 25 multiplications and 5 divisions.

In particular, the calculation of $V_x$:

$$V_x=-b/(2 \cdot a)=(x_1 \cdot t_1-x_2 \cdot t_2+x_3 \cdot t_3+x_2 \cdot t_{4a}-x_3 \cdot t_{4b})/(2 \cdot (t_1-t_2+t_3+t_4));$$

where $t_1, t_2, t_3, t_{4a}, t_{4b}$ and $t_4$ is the same as (11). So the total operations to calculate $V_x$ are: 10 sums, 1 shift, 11 multiplications and 1 division.

We can further optimize the calculation of $V_x$ in the following manner:

$$V_x=-b/(2 \cdot a)=(x_1 \cdot t_1+x_2 \cdot t_2+x_3 \cdot t_3)/(2 \cdot (t_1+t_2+t_3));$$

$$t_1=x_1 \cdot (y_3-y_2),\ t_2=x_2 \cdot (y_1-y_3);\ t_3=x_3 \cdot (y_2-y_1);$$

So the total operations to calculate $V_x$ are further reduced: 7 sums, 1 shift, 6 multiplications and 1 division.

Figure 13:
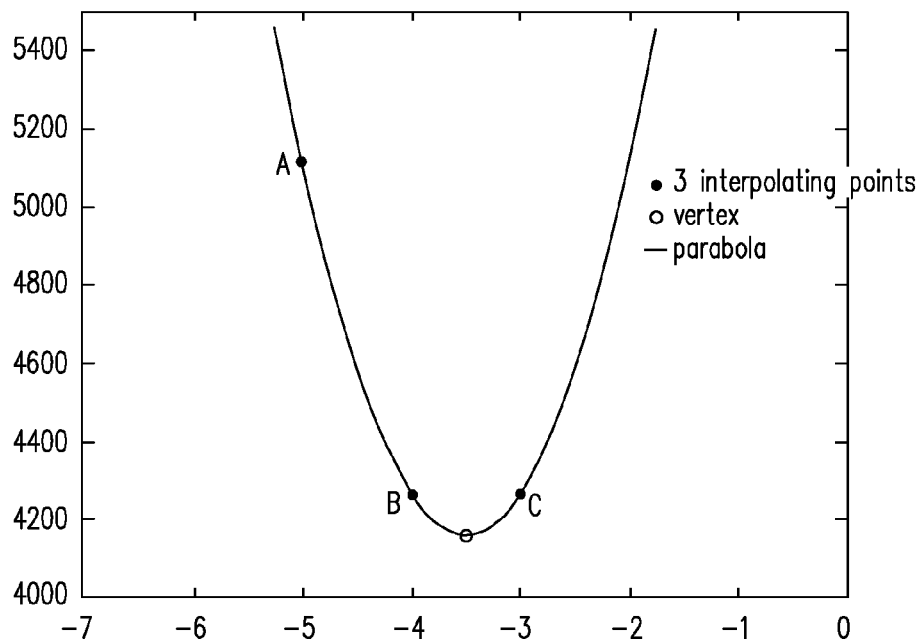
FIGS. 13 and 14 illustrate sub-pixel matching according to an embodiment.
Figure 14:
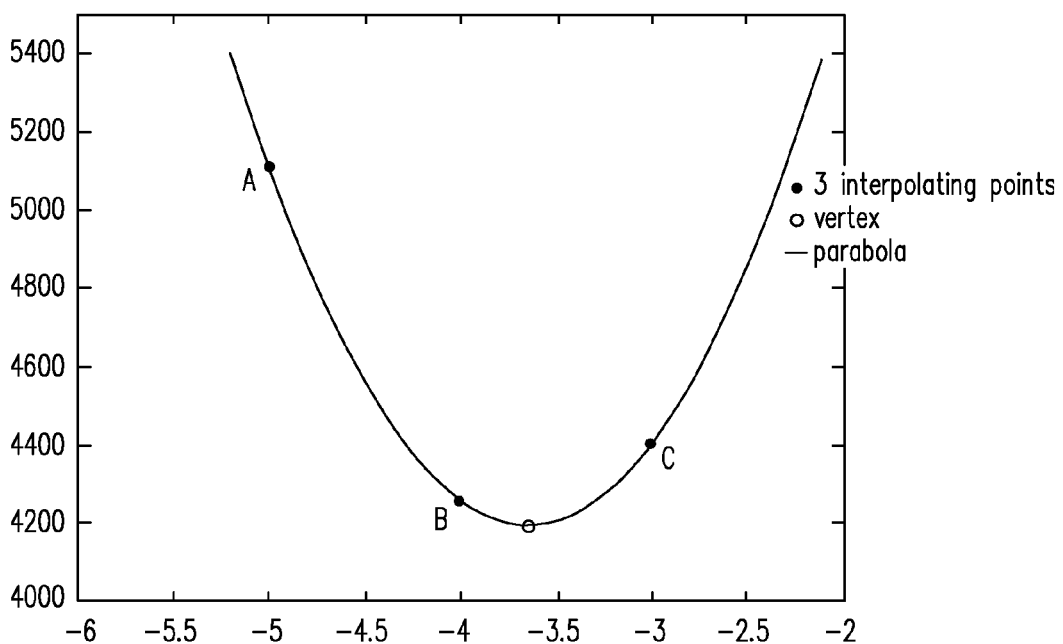

Just to show an example, if we consider the three points $A=(x_1,y_1)=(-5, 5111)$, $B=(x_2,y_2)=(-4, 4259)$ and $C=(x_3,y_3)=(-3, 4259)$, we obtain $V=(V_x,V_y)=(-3.5, 4152.5)$, that is exactly on the middle of the points B and C, since they have the same y-coordinate, as indicated in FIG. 13. In the case in which the two points near the vertex have not got the same y-coordinate, the vertex will be situated near the point which has got the lower y-coordinate, as shown in FIG. 14.

In the calculation of the vertex $V_x$, the parameter a assumes an important role. In fact, if a is greater than zero, then the parabola is convex, with the vertex down; if a is lower than zero, then the parabola is concave, with the vertex up; if a is equal to zero, then we have a line. Since we are interested in calculating the minimum of the parabola, a should be always greater than zero.

Figure 15:
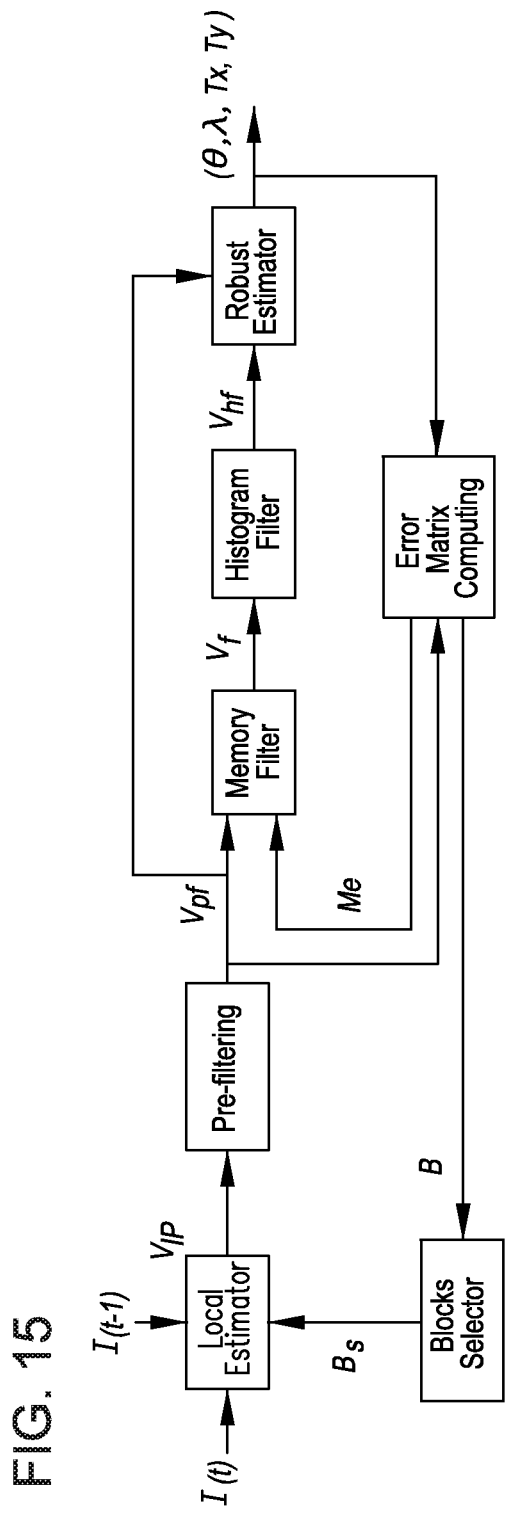
FIG. 15 illustrates the process of determining inter-frame transformation parameters according to an embodiment.

The second step shown in FIG. 1 relates to parameter extraction. Starting from a pair of consecutive frames (I(t), I(t−1)) inter-frame transformation parameters λ, the zoom parameter, θ, the rotation angle, $T_x$ and $T_y$, respectively X-axis and Y-axis shifts, are computed. Basic blocks of step 2 are described in US 2010124379 A1. FIG. 15 illustrates a motion estimation algorithm according to an example embodiment. As compared to the algorithm described in US 2010124379 A1, in particular, according to one example, a histogram filter is employed.

In order to reduce the complexity of the algorithm, a proper selection of the blocks in used for the computation of local motion vectors may be done. The selection takes into account block history (typically a good block at time t is also reliable at time t+1), and random insertion (the variability of the scene condition is considered). In real time, a fixed upper bound of the number of operations may be set. In particular, the maximum number of blocks in which to compute local motion vector is typically known in advance. This upper bound is called maxVectorsNumber. The algorithm considers two percentage thresholds: selectHistory and selectRandom (their sum is equal to one). These thresholds determine the number of vectors selected due to their history (selectHistory*maxVectorNumber) or in a random way (selectRandom* maxVectorNumber). An Error Matrix Computing module provides information about the history of each block (boolean matrix $M_b$). This information is the starting point of the selection algorithm.

Figure 16:
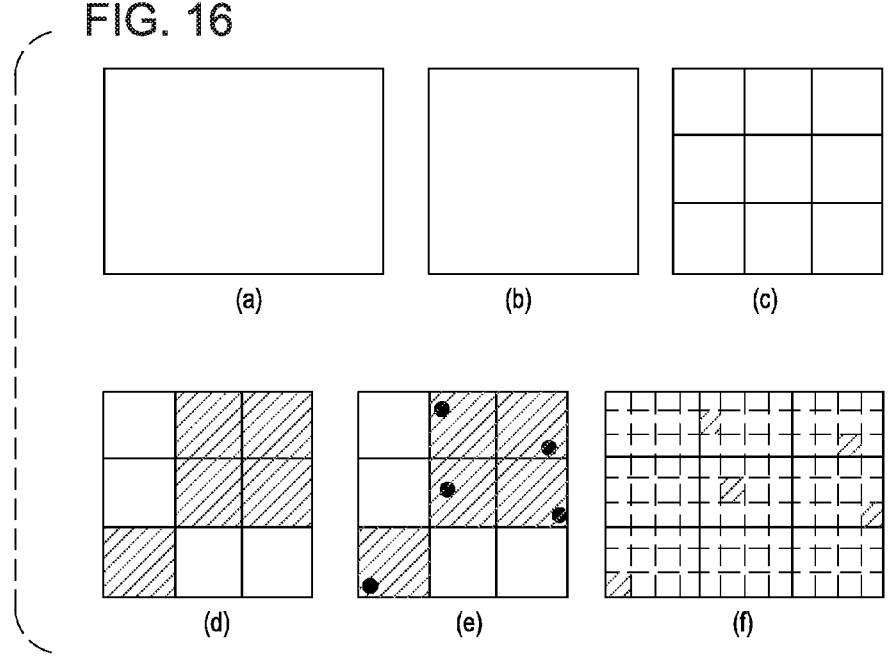
FIG. 16 illustrates block selection for the determination of motion vectors according to an embodiment.

First of all, the reliable block positions provided by $M_b$ are propagated into the neighborhood through morphological operators producing a Bmo positions matrix. This step embodies spatial similarity considerations (typically the neighbors of a good vector are also reliable vectors) and improves the performance of a pre-filtering module (see below). In fact some filtering criteria take into account neighbors' behavior and do not work properly in absence of a neighborhood. To fulfill the upper bound requirement a pruning step is also performed. This step eliminates the surplus vectors in a uniform way. We call the novel positions matrix Bmop, which thus far has been considered at most selectHistory*maxVectorNumber vectors. The remaining vectors are then randomly selected. To provide neighborhood information to each selected block, they are chosen in groups of four. Moreover, in order to force a uniform spatial distribution the following algorithm has been developed (see FIG. 16):

1. The rectangle image is transformed in a square image. The edge of the square is equal to the smaller rectangle size.
2. The square image is divided into $M^2$ square regions. If one selects N group of blocks, M is the smaller integer that satisfy $M2>N$.
3. N square regions are randomly selected between the available M2.
4. For each selected region a real point is randomly selected.
5. The 2D coordinates of the selected points are transferred in the original rectangle and quantized.

To cope with possible overlaps, the steps above listed are iteratively repeated until every group of blocks have been placed. Each new iteration starts with the residual elements (blocks not yet inserted) of the previous one. However, the overall number of iterations to be done is typically be fixed in advance (an upper bound is necessary to satisfy the real-time computation requirements). To sum up the random insertion step, starting from Bmop, a Bs positions matrix is computed. This matrix, together with input frames at time t and t−1, is the input of the local estimator module shown in FIG. 15.

Local motion estimator typically computes many wrong motion vectors. To filter out these vectors that are not useful for global motion estimation, we make use of the following considerations:

The IP_Error_x and IP_Error_y values have to be low (effective match).
Local motion vectors have to share in their neighborhood similar values (motion continuity).
Local motion vectors referred to homogeneous blocks are not reliable.

The above rules have been derived after an exhaustive experimental phase devoted to achieve a suitable trade-off between overall complexity and real-time constraints. According to the previous consideration we have derived five indexes: IP_Error_x and IP_Error_y (goodness of matching), NS (neighborhood similarity), DispX and DispY.

Both IP_Error_x, IP_Error_y and the inhomogeneity indexes (DispX and DispY) have been already computed during the curve matching phase. NS is computed as follows:

$$NS(i, j) = \frac{1}{8} \sum_{k=-1}^{1} \sum_{h=-1}^{1} |Mv_x(i, j) - Mv_x(i+k, j+h)| + |Mv_y(i, j) - Mv_y(i+k, j+h)|$$

where $M_{vx}(i,j)$ and $M_{vy}(i,j)$ are the motion vectors respectively in horizontal and vertical direction of the block in position (i,j).

As already mentioned above a new matching formula was introduced in EP 2 204 982 A1 (see equations 9 and 10):

$$P_h(s) = \sum_{j=\max\_s}^{M-\max\_s} |RCF_v^{F1}(j) - RCF_v^{F2}(j+s)|$$

$$off_h = \{s': P_h(s') = \min P_h(s)\}$$

$$P_v(s) = \sum_{i=\max\_s}^{N-\max\_s} |RCF_h^{F1}(i) - RCF_h^{F2}(i+s)|$$

$$off_v = \{s': P_v(s') = \min P_v(s)\}$$

with the matching curve $P_v(s)$ and parameters RCFh and RCFv for frame F in horizontal and vertical directions $$RCF_k^x(j) = \sum_{i=1}^{m} p_{ij}$$

$$RCF_k^y(i) = \sum_{j=1}^{n} p_{ij}$$

where $p_{ij}$ denotes the pixel value in position (i, j). IP_Error_x=min $P_h(s)$ and IP_Error_y=min $P_v(s)$, that is they are the matching error values provided by the local estimator based on integral projections. DispX=(max RCFx−min RCFx) and DispY=(max RCFy−min RCFy), that is they are the difference between maximum and minimum values of the integral projection curves.

The Prefiltering module filters local motion vectors by computing first the values IP_Error_x, IP_Error_y, NS, DispX, DispY. All the vectors with both DispX and DispY less than $th_{Hom}$ (a threshold experimentally fixed) are filtered out. Starting from VIP vectors $V_{pf2}$ vectors are produced. $V_{pf2}$ vectors are then sorted in ascending order according to IP_Error_x, IP_Error_y (and NS) values, labelling also a percentage ppf1 (ppf2) of vectors with high IP_Error_x, IP_Error_y (NS) values as deleted. Moreover Vpf2 vectors are sorted in descending order according to DispX (and DispY) values, labeling a percentage ppf3 of vectors with low DispX (DispY) values as deleted. Finally the labeled vectors are rejected obtaining as final output a set of vectors $V_{pf}$.

The above-described filtering is devoted to eliminate all the wrong vectors computed by a generic BM algorithm. However, due to moving objects in the scene, there are vectors correctly computed by BM (hence, not filtered by Prefiltering module) that is typically deleted in order to have a good inter-frame parameters estimation. If the moving objects are not very big, their vectors probably will be rejected by robust estimation module. On the contrary if the moving objects are very big (even greater than 50% of the scene), single image information is not enough to filter out these vectors.

In order to make robust our algorithm to such situation, a History (Memory) filter module uses information on previous frames. All the $V_{pf}$ vectors are split into $V_{pfnew}$ (vectors not belonging to $V_{pf}$ at the previous iteration t−1) and $V_{pfOld}$ (vectors belonging to $V_{pf}$ at the previous iteration t−1). A percentage pmf1 of $V_{pfnew}$ vectors is then rejected. They are considered less reliable than $V_{pfOld}$ vectors. We call the remaining vectors (not rejected) $V_{pfnewF}$. According to $M_e$(t−1) vector error values, $V_{pfOld}$ vectors are sorted and filtered out (a percentage pmf2 with high error). We call the remaining vectors (not rejected) $V_{pfOldF}$. Finally $V_{pfnewF}$ and $V_{pfOldF}$ vectors are merged together into Vf.

Figure 17:
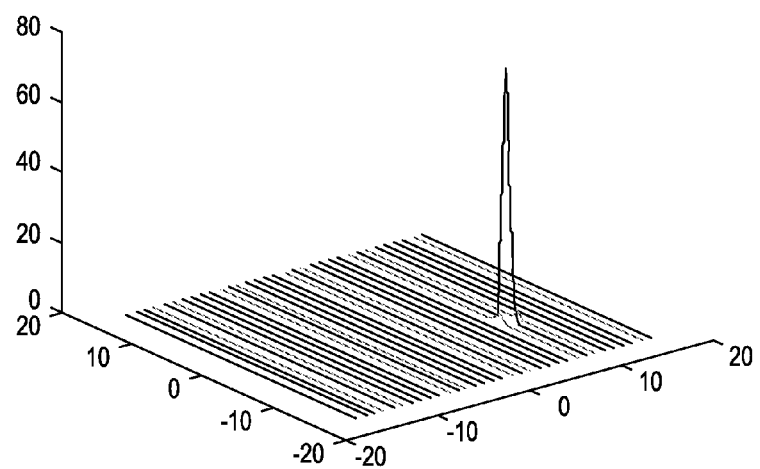
FIG. 17 shows a histogram obtained from motion vector components according to an embodiment.
Figure 18:
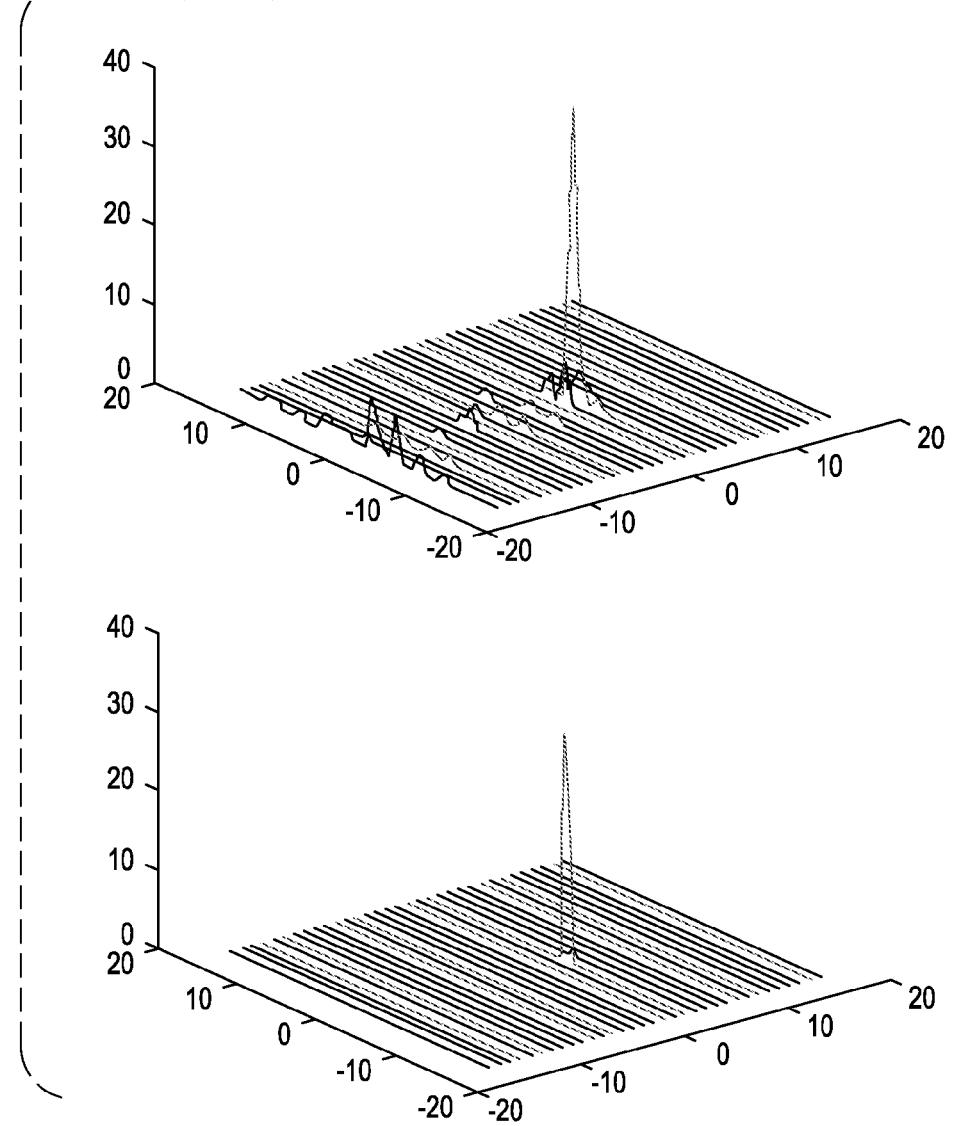
FIG. 18 shows a histogram obtained from motion vector components in the case of a big moving object before (left diagram) and after (right diagram) applying a histogram filter according to an embodiment.

Employment of a histogram filter represents a novel aspect. This innovative step improves the robustness of the proposed approach in presence of moving objects in the scene. Due to the limited amount of rotation and zoom factor involved in the mobile applications, motion vector components and translational parameters should have comparable values. Considering a 2D histogram of motion vector components, the vectors typically have the characteristics depicted in FIG. 17: motion vectors are very close to each other. In presence of big moving objects the 2D histogram contains multiple peaks as depicted in FIG. 18 (before (left figure) and after (right figure) histogram filter application. Typically, only one peak corresponds to the camera motion, the other one is related to a moving object entering in the scene. The histogram filter finds the highest peak in the 2D histogram and filters out all the vectors that are too far away from it (based on some predetermined threshold determined based on the maximum rotation and allowed scale). The remaining vectors (Vhf) are then propagated to the Robust Estimator module (see FIG. 15).

Global motion between adjacent frames can be estimated with a two-dimensional similarity model, usually a good trade-off between effectiveness and complexity. This exemplary model describes inter-frame motion using four different parameters, namely two shifts, one rotation angle and a zoom factor, and it associates a point $(x_i, y_i)$ in frame $I_n$ with a point $(x_f, y_f)$ in frame $I_{n+1}$ with the following transformation:

$$\begin{cases} x_f = x_i \lambda \cos\theta - y_i \lambda \sin\theta + T_x \\ y_f = x_i \lambda \sin\theta + y_1 \lambda \cos\theta + T_y \end{cases}$$

where $\lambda$ is the zoom parameter, $\theta$ the rotation angle, $T_x$ and $T_y$ respectively X-axis and Y-axis shifts. Considering N motion vectors we obtain the following over-constrained linear system:

$$A \cdot p = b \quad A = \begin{pmatrix} x_{i1} & -y_{i1} & 1 & 0 \\ \vdots & \vdots & \vdots & \vdots \\ x_{in} & -y_{in} & 1 & 0 \\ y_{i1} & x_{i1} & 0 & 1 \\ \vdots & \vdots & \vdots & \vdots \\ y_{in} & x_{in} & 0 & 1 \end{pmatrix}$$

$$p = \begin{pmatrix} a \\ b \\ c \\ d \end{pmatrix} \quad b = \begin{pmatrix} x_{f1} \\ \vdots \\ x_{fn} \\ y_{f1} \\ \vdots \\ y_{fn} \end{pmatrix}$$

where $a = \lambda \cos\theta$, $b = \lambda \sin\theta$, $c = T_x$, $d = T_y$.

Vectors computation may be affected by noise so it is useful to apply a linear Least Squares Method on a set of redundant equations to obtain the parameters vector.

$$p = (A^t \cdot A)^{-1} \cdot A^t \cdot b$$

All the similarity model parameters $\lambda$, $\theta$, $T_x$, $T_y$ can be easily derived from p vector components in the following way:

$\lambda = \sqrt{a^2 + b^2}$
$\theta = \tan^{-1}(b/a)$
$T_x = c$
$T_y = d$

The whole set of local motion vectors probably includes wrong matches or correct matches belonging to self-moving objects in the filmed scene. Obviously, there are some correct pairs that do represent real camera shakes but several points simply do not relate to such information. Least Squares Method does not perform well when there is a large portion of outliers in the total number of features, as in this case. However, outliers can be identified, filtered out of the estimation process, resulting in better accuracy.

In order to obtain real-time performances we have implemented a fast rejection technique:

Starting from Vhf values it computes a first Least Squares estimation of the inter-frame transformation parameters ($\lambda_1$, $\theta_1$, $T_{x1}$, $T_{y1}$).

Motion vectors which component along x and y axes are too far from the translational values ($T_{x1}$, $T_{y1}$) previously computed are filtered out. Due to the limited amount of rotation and zoom factor involved in the mobile applications, motion vector components and translational parameters should have values close to each other.

For each $V_d$ element two error measure ($E_1$, $E_2$) are computed that are given by the following formula:

$$E_1 = e_x^2 + e_y^2$$

$$E_2 = \frac{((x_s - x_i) \cdot (x_f - x_i) + (y_s - y_i) \cdot (y_f - y_i))^2}{snorm_1 \cdot snorm_2}$$

$$snorm_1 = (x_s - x_i)^2 + (y_s - y_i)^2$$

$$snorm_2 = (x_f - x_i)^2 + (y_f - y_i)^2$$

$$e_x = x_s - x_f$$

$$e_y = y_s - y_f$$

where $(x_i, y_i)$ is the center of a block (related to a vector) in the frame $t-1$, $(x_f, y_f)$ is the position of the block at frame t computed by the local motion vector estimator, and $(x_s, y_s)$ is the position estimated according to inter-frame parameters ($\lambda_1$, $\theta_1$, Tx1, Ty1).

According to the error $E_1$ (and $E_2$), it sorts all $V_d$ elements in increasing order and filters out a percentage with high error value. We call the remaining vectors (not filtered out) $V_s$. Starting from $V_s$ values it computes the Least Squares estimation of the inter-frame transformation parameters ($\lambda$, $\theta$, Tx, Ty).

Figure 19:
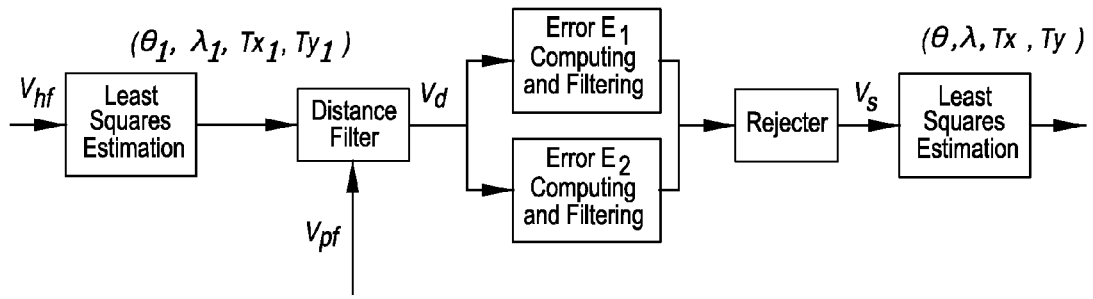
FIG. 19 illustrates a process for obtaining similarity model parameters according to an embodiment.

A diagram describing how the Robust Estimation block works is shown in FIG. 19. The error measure $E_1$ is the square Euclidean distance between estimated and measured motion vectors whereas $E_2$ is the square of the cosine of the angle between them. Both $E_1$ and $E_2$ sometimes fail considering reliable vectors that differ really much with respect to the real frame motion. However, by combining them these evaluation errors are dramatically reduced.

Figure 20:
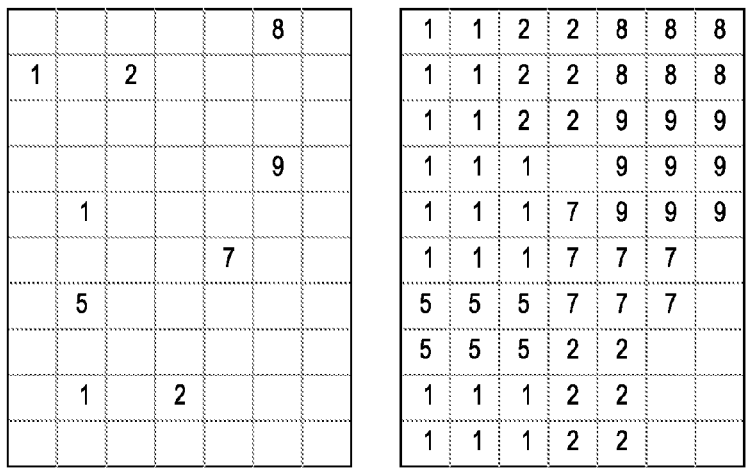
FIG. 20 shows error propagation in computing an error matrix according to an embodiment.

Eventually, an error matrix is computed (see FIG. 15). For each $V_{pf}$ element it is computed an error (Euclidean Distance) used to fill the $M_e$ error matrix. This metric is simple to compute and able to efficiently distinguish between vectors belonging to objects entering in the scene and vectors describing the scene movements. Usually $V_{pf}(t)$ contains elements corresponding to blocks that were not present in $V_{pf}(t-1)$. Hence some vectors have not an $M_e$ entry when they are considered in the History filter. In order to partially solve this problem, we propagate error vectors value to its neighborhood by simply copying each error value into its neighbors with no value associated. The algorithm is computed from left to right, from up to down as illustrated in FIG. 20.

Figure 21:
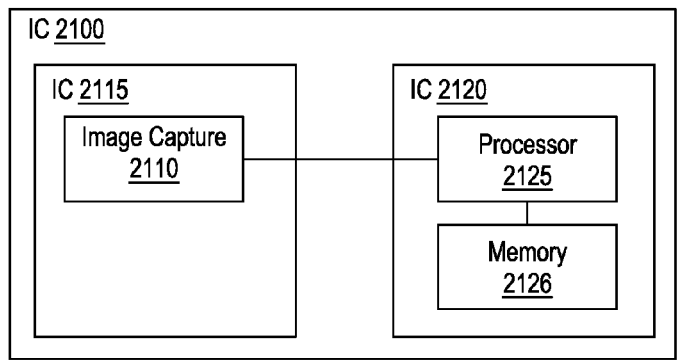
FIG. 21 shows system diagram of an embodiment disclosed herein.

FIG. 21 shows system diagram of an embodiment disclosed herein. In this embodiment and image capture device 2110 is shown as disposed on a first integrated circuit die 2115. This first integrated circuit die may be coupled to a second integrated circuit die 2120 that may include a processor 2125 and a memory 2126. In other embodiments, the first and second integrated circuit dies 2115 and 2120 as shown may be a single integrated circuit die. Further yet, any of the methods described herein may be embodied in a computer readable medium having computer executable instructions to be executed by various circuits and processors as described herein.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the disclosure.

What is claimed is:

1. A method for filtering a current image frame of a video sequence from spurious motion, comprising:
    dividing the current image frame and a preceding image frame of the video sequence into overlapping blocks of pixels;
    determining motion vectors for the blocks of the image frame;
    determining inter-frame transformation parameters for the image frame based on the determined motion vectors;
    filtering the determined motion vectors of current image frame, wherein the filtering comprises,
        filtering historical motion vectors determined for the current image frame by determining a first group of motion vectors equal to the motion vectors determined for the preceding image frame and a second group of motion vectors other than motion vectors determined for the preceding image frame,
        deleting some motion vectors of the first and second groups of motion vectors to generate first and second reduced sets of motion vectors,
        combining the first and second reduced sets of motion vectors to obtain a combined set of motion vectors; and
    generating a filtered current image frame based on the determined inter-frame transformation parameters and the combined set of motion vectors.

2. The method according to claim 1, wherein the motion vectors are determined by block matching and each of the blocks comprises a sub-set of pixels that are used only for the determination of the motion vectors.

3. The method according to claim 1, further comprising a sub-pixel determination of a minimum of a matching curve for a regular pattern comprised in the image frame.

4. The method according to claim 1, further comprising generating a histogram of determined motion vectors and applying a histogram filter to the determined combined set of motion vectors to find a highest peak in the histogram and to filter out motion vectors with a distance from the found highest peak that is larger than a predetermined threshold.

5. The method according to claim 2, wherein at least 32 pixels are used for the block matching and/or the size of the searching window in each direction is more than 5% of the dimension of the image frame in that direction and/or the number of blocks the image is divided into is at least 200.

6. The method according to claim 2, wherein each of the searching windows comprises 16×16, or 32×32, or 40×40 or 64×64 pixels and/or each of the blocks comprises 64×64, 96×96, or 112×112 or 160×160 pixels and/or overlapping regions of the blocks comprise 16×16, or 32×32, or 40×40 or 48×48 pixels.

7. The method according to claim 3, wherein the sub-pixel determination is based on an equation of a parabola.

8. The method according to claim 4, further comprising applying a history filter to motion vectors determined for a current image frame comprising determining a first set of motion vectors that are the same as motion vectors determined for a previous image frame and a second set of motion vectors that are not the same as motion vectors determined for the previous image frame, deleting some motion vectors of the first and second sets of motion vectors and combining the thus reduced sets of motion vectors to obtain a combined set of motion vectors and wherein the histogram filter is applied to the combined set of motion vectors.

9. The method according to claim 8, wherein the second set of motion vectors is reduced based on an error matrix for the previous image frame.

10. A image capture device, comprising:
    an image receive circuit configured to divide a first image frame and a second image frame of a video sequence into overlapping blocks of pixels;
    a calculation circuit configured to determine motion vectors for the blocks of the first image frame in relation to the second image frame and to determine inter-frame transformation parameters for the first image frame based on the determined motion vectors and based on filtering the determined motion vectors, the filtering comprising,
        filtering historical motion vectors determined for the current image frame by determining a first group of motion vectors equal to the motion vectors determined for the preceding image frame and a second group of motion vectors other than motion vectors determined for the preceding age frame,
        deleting some motion vectors of the first and second groups of motion vectors to generate first and second reduced sets of motion vectors,
        combining the first and second reduced sets of motion vectors to obtain a combined set of motion vectors; and
    an image generation circuit configured to generate a filtered image frame based on the determined inter-frame transformation parameters and the combined set of motion vectors; and
    a memory configured to store the filtered image.

11. The image capture device of claim 10, further comprising:
    a pre-filtering circuit configured to apply a high pass filter to received image frames.

12. The image capture device of claim 10, further comprising a local estimation circuit configured to compute motion vectors to be filtered prior to generation of the motion vectors in the calculation circuit.

13. The image capture device of claim 10, wherein the calculation block further comprises:
    a memory filter configured to receive images frames and filter images frames based on a history of received image frames;

a histogram circuit coupled to the memory filter and configured to apply a histogram filter to image frames from the memory filter; and an error matrix generator coupled to the histogram circuit and configured to generate an error matrix based on the histogram filtered image.

14. The image capture device of claim 10, a display for displaying the stored image.

15. The image capture device of claim 10, wherein the image capture device comprises a mobile video camera.

16. The image capture device of claim 13, wherein the histogram circuit is further configured to generate a histogram of determined motion vectors and apply a histogram filter to the determined motion vectors to find a highest peak in the histogram and to filter out motion vectors with a distance from the found highest peak that is larger than a threshold.

17. The image capture device of claim 16, wherein the histogram is further configured to apply a history filter to motion vectors determined for the first image frame such that determining a first set of motion vectors that are the same as motion vectors determined for a previous image frame and a second set of motion vectors that are not the same as motion vectors determined for the previous image frame, and further configured to delete some motion vectors of the first and second sets of motion vectors and combine the reduced sets of motion vectors to obtain a combined set of motion vectors.

18. The image capture device of claim 16, wherein the error matrix generator is further configured to reduce the second set of motion vectors in response to generating an error matrix based on the second image frame.

19. The image capture device of claim 16, wherein the motion vectors are determined by block matching and each of the blocks comprises a sub-set of pixels that are used only for the determination of the motion vectors.

20. An integrated circuit, comprising:

an image receive circuit configured to divide a first image frame and a second image frame of a video sequence into overlapping blocks of pixels;

a calculation circuit configured to determine motion vectors for the blocks of the first image frame in relation to the second image frame and to determine inter-frame transformation parameters for the first image frame based on the determined motion vectors and based on filtering the determined motion vectors, the filtering comprising, filtering historical motion vectors determined for the current image frame by determining a first group of motion vectors equal to the motion vectors determined for the preceding image frame and a second group of motion vectors other than motion vectors determined for the proceeding image frame, deleting some motion vectors of the first and second groups of motion vectors to generate first and second reduced sets of motion vectors, combining the first and second reduced sets of motion vectors to obtain a combined set of motion vectors; and an image generation circuit configured to generate a filtered image frame based on the determined inter-frame transformation parameters and the combined set of motion vectors.

21. The integrated circuit of claim 20, further comprising a single integrated circuit die.

22. The integrated circuit of claim 20, further comprising multiple integrated circuit dies.

23. A system, comprising:
a first integrated circuit die including:
an image receive circuit configured to divide a first image frame and a second image frame of a video sequence into overlapping blocks of pixels;

a calculation circuit configured to determine motion vectors for the blocks of the first image frame in relation to the second image frame and to determine inter-frame transformation parameters for the first image frame based on the determined motion vectors and based on filtering the determined motion vectors, the filtering comprising, filtering historical motion vectors determined for the current image frame by determining a first group of motion vectors equal to the motion vectors determined for the preceding image frame and a second group of motion vectors other than motion vectors determined for the preceding image frame, deleting some motion vectors of the first and second groups of motion vectors to generate first and second reduced sets of motion vectors, combining the first and second reduced sets of motion vectors to obtain a combined set of motion vectors; and an image generation circuit configured to generate a filtered image frame based on the determined inter-frame transformation parameters and the combined set of motion vectors; and a second integrated circuit die coupled to the first integrated circuit die.

24. The system of claim 23, further comprising a processor disposed on one of the first and second integrated circuit dies.

25. The system of claim 23, further comprising a memory disposed on one of the first and second integrated circuit dies.

26. The system of claim 23, further comprising one of a mobile video capturing device, a digital video camera, a mobile phone, and a digital camera.

27. A non-transitory computer-readable medium having computer-executable instructions for:

dividing a first image frame and a second image frame of a video sequence into overlapping blocks of pixels;

determining motion vectors for the blocks of the first image frame in relation to the second image frame;

filtering the determined motion vectors;

determining inter-frame transformation parameters for the first image frame based on the determined motion vectors;

generating a filtered image frame based on the determined inter-frame transformation parameters; and storing the filtered image in a memory;

generating a histogram of determined motion vectors and applying a histogram filter to the determined motion vectors to find a highest peak in the histogram and to filter out motion vectors with a distance from the found highest peak that is larger than a threshold;

applying a history filter to determined motion vectors;

determining a first set of motion vectors that are the same as motion vectors determined for a previous image frame;

determining a second set of motion vectors that are not the same as motion vectors determined for the previous image frame;

deleting some motion vectors of the first and second sets of motion vectors; and combining reduced sets of motion vectors to obtain a combined set of motion vectors such that the histogram filter is applied to the combined set of motion vectors.

28. The computer-readable medium of claim 27, further comprising computer-executable instructions wherein the motion vectors are determined by block matching and each of the blocks comprises a sub-set of pixels that are used only for the determination of the motion vectors.

29. The computer-readable medium of claim 27, further comprising computer-executable instructions wherein each block comprises at least 32 pixels; the method further comprising generating a plurality of searching windows having a pixel size in each direction that is at least 5% of dimensions of the first image frame.

30. A method, comprising:
dividing a first image frame into overlapping blocks of pixels;
dividing a second image frame into corresponding overlapping blocks of pixels;
determining motion vectors for the blocks of the first image frame in relation to the second image frame;
filtering the determined motion vectors;
determining inter-frame transformation parameters for the first image frame based on the determined motion vectors;
generating a filtered image frame based on the determined inter-frame transformation parameters; and
storing the filtered image in a memory;
generating a histogram of determined motion vectors and applying a histogram filter to the determined motion vectors to find a highest peak in the histogram and to filter out motion vectors with a distance from the found highest peak that is larger than a threshold;
applying a history filter to determined motion vectors;
determining a first set of motion vectors that are the same as motion vectors determined for a previous image frame;
determining a second set of motion vectors that are not the same as motion vectors determined for the previous image frame;
deleting some motion vectors of the first and second sets of motion vectors; and
combining reduced sets of motion vectors to obtain a combined set of motion vectors such that the histogram filter is applied to the combined set of motion vectors.

31. The method of claim 30, wherein the motion vectors are determined by block matching and each of the blocks comprises a sub-set of pixels that are used only for the determination of the motion vectors.

32. The method of claim 30, wherein each of the searching windows comprises dimensions of one of 16×16, 32×32, 40×40 and 64×64 pixels and each of the blocks comprises dimensions of one of 64×64, 96×96, 112×112, and 160×160 pixels such that overlapping regions of the blocks comprise dimensions of one of 16×16, 32×32, 40×40 and 48×48 pixels.

33. The method of claim 30, further comprising a sub-pixel determination of a minimum of a matching curve for a regular pattern comprised in the first image frame.

34. The method of claim 31, wherein each block comprises at least 32 pixels; the method further comprising generating a plurality of searching windows having a pixel size in each direction that is at least 5% of dimensions of the first image frame.

35. The method of claim 33, wherein the sub-pixel determination is based on an equation of a parabola.

\* \* \* \* \*

UNITED STATES PATENT AND TRADEMARK OFFICE
CERTIFICATE OF CORRECTION

| | | |
|---|---|---|
| PATENT NO. | : 9,100,573 B2 | Page 1 of 1 |
| APPLICATION NO. | : 13/841583 | |
| DATED | : August 4, 2015 | |
| INVENTOR(S) | : Giusseppe Spampinato et al. | |

It is certified that error appears in the above-identified patent and that said Letters Patent is hereby corrected as shown below:

IN THE CLAIMS

Column 14, Line 41:
"determined for the preceding age frame," should read, --determined for the preceding image frame,--.

Signed and Sealed this
Eighth Day of March, 2016

Michelle K. Lee
*Director of the United States Patent and Trademark Office*